(12) United States Patent
Nishimura et al.

(10) Patent No.: US 8,111,603 B2
(45) Date of Patent: Feb. 7, 2012

(54) OPTICAL DISK APPARATUS AND ITS REPRODUCING METHOD

(75) Inventors: Koichiro Nishimura, Yokohama (JP); Masayuki Inoue, Yokohama (JP)

(73) Assignee: Hitachi, Ltd., Tokyo (JP)

(*) Notice: Subject to any disclaimer, the term of this patent is extended or adjusted under 35 U.S.C. 154(b) by 424 days.

(21) Appl. No.: 11/905,407

(22) Filed: Sep. 28, 2007

(65) Prior Publication Data

US 2008/0089203 A1 Apr. 17, 2008

(30) Foreign Application Priority Data

Sep. 29, 2006 (JP) ................. 2006-266353

(51) Int. Cl.
- *G11B 7/00* (2006.01)
- *G11B 5/00* (2006.01)
- *G11B 7/12* (2006.01)
- *G11B 11/00* (2006.01)

(52) U.S. Cl. .............. 369/116; 369/47.5; 369/53.23
(58) Field of Classification Search ............ 369/53.23
See application file for complete search history.

(56) References Cited

U.S. PATENT DOCUMENTS

| 6,731,584 | B1 * | 5/2004 | Nagara .................. 369/116 |
| 2004/0223438 | A1 | 11/2004 | Kura et al. | |
| 2005/0169147 | A1 | 8/2005 | Kobayashi et al. | |
| 2006/0105134 | A1 * | 5/2006 | LeBlanc et al. .............. 428/64.4 |
| 2006/0250918 | A1 * | 11/2006 | Hsu et al. .................. 369/59.11 |

FOREIGN PATENT DOCUMENTS

| JP | 08-339569 | 12/1996 |
| JP | 8-339569 | 12/1996 |
| JP | 08339569 A * | 12/1996 |
| JP | 2000-149302 | 5/2000 |
| JP | 2003-187481 | 7/2003 |
| JP | 2004-253032 | 9/2004 |
| JP | 2004-355723 | 12/2004 |
| JP | 2004355723 A * | 12/2004 |
| JP | 2005-216395 | 8/2005 |
| JP | 2006-221706 | 8/2006 |
| JP | 2006-236495 | 9/2006 |
| WO | WO2005/043521 A1 | 5/2005 |

OTHER PUBLICATIONS

English translation of Japanese patent publication JP,H08-339569,A.*
English translation of Japanese patent publication JP2004-355723,A.*
Japanese Office Action, issued in Japanese Patent Application No. 2006-266353, dated Aug. 4, 2009.
JP Office Action issued in JP Appln. No. JP2010-061780 dated Aug. 3, 2010.
Japanese Office Action issued in Japanese Patent Application No. JP 2010-061780 dated Nov. 2, 2010.

* cited by examiner

*Primary Examiner* — Joseph Haley
*Assistant Examiner* — Nicholas Lee
(74) *Attorney, Agent, or Firm* — McDermott Will & Emery LLP

(57) ABSTRACT

Amplitude and frequency of a high-frequency signal superposed on a reproduction laser beam are changed in accordance with a reproduction spot diameter on the surface of the recording layer upon discrimination of an optical disk in initial adjustment after insertion of the optical disk and change of a layer of a multi-layer optical disk. Further, the high-frequency signal is not superposed on the reproduction laser beam until end of the discrimination and change to a target layer upon discrimination of the optical disk and change of a layer of a multi-layer optical disk.

17 Claims, 11 Drawing Sheets

|  | Blu-Ray | HD-DVD | BD/HD-DVD |
|---|---|---|---|
| THICKNESS OF COVER LAYER [mm] | 0.1 | 0.6 | 0.17 |
| LASER WAVELENGTH $\lambda$ ... [nm] | 405 | 405 | 1 |
| NUMERICAL APERTURE NA | 0.85 | 0.65 | 1.31 |
| REPRODUCTION LASER POWER [mW] | 0.3 | 0.5 | 0.60 |
| $(\lambda/NA)^2 \propto$ SPOT AREA S | 227024.2 | 388224.9 | 0.58 |
| REPRODUCTION LASER POWER/$(\lambda/NA)^2$ | $1.3 \times 10^{-6}$ | $1.2 \times 10^{-6}$ | 1.08 |

OPTICAL DISK APPARATUS AND ITS REPRODUCING METHOD

INCORPORATION BY REFERENCE

The present application claims priority from Japanese application JP 2006-266353 filed on Sep. 29, 2006, the content of which is hereby incorporated by reference into this application.

BACKGROUND OF THE INVENTION

The present invention relates to control of laser waveform upon reproduction of information in an optical disk apparatus.

In an optical disk apparatus using a laser beam emitted from a laser diode to read information of mark and space recorded in an optical disk, it is important to decide binary information of mark and space without error. However, there is a problem that noise such as mode hop noise and return light noise is produced in the laser beam.

As a method of reducing such noise, JP-A-2000-149302 discloses a method named high-frequency superposition. Further, as a method of controlling the laser power upon reproduction, JP-A-2005-216395 discloses a method named automatic power control (APC).

Recently, optical disks having different standards such as CD, DVD, Blu-Ray disc (hereinafter abbreviated to BD) and HD-DVD are taken to the market. These optical disks are not compatible with one another, although optical disk apparatuses dealing with recording and reproduction for CD, DVD and BD and optical disk apparatuses dealing with recording and reproduction for CD, DVD and HD-DVD are taken to the market in consideration of user's convenience. However, an optical disk apparatus dealing with recording and reproduction of both of BD and HD-DVD is not taken to the market yet.

It is considered as a cause of the reason that there are different points on the standards between the optical disks conforming to the BD standards (hereinafter referred to as "optical disks 1") and the optical disks conforming to the HD-DVD standards (hereinafter referred to as "optical disks 2") as shown in FIG. 4. The relation of the wavelength of the laser beam (405 nm for both of BD and HD-DVD) and the numerical aperture of lens (0.85 for BD and 0.65 for HD-DVD) prescribed in the standards is considered as being particularly a problem among them.

When the wavelength of the laser beam is $\lambda$ and the numerical aperture of lens is NA, it is known that a spot diameter of the laser beam on the optical disk is proportional to:

$$(\lambda/NA) \quad \text{(expression 1)}$$

and a spot area on the optical disk of the laser beam is proportional to:

$$(\lambda/NA)^2 \quad \text{(expression 2)}$$

That is, the spot areas on the optical disk are different between the BD standards and the HD-DVD standards. The reproduction laser power values for the BD standards and the HD-DVD standards are made different to be 0.3 mW and 0.5 mW, respectively, so that the power of the laser beam per unit area is made substantially equal.

When the characteristics (amplitude and frequency) of the high-frequency signal superposed in order to reduce noise of the laser beam are fixed, satisfactory reproduction can be made for one optical disks, although there arises a problem that satisfactory reproduction cannot be made for the other optical disks and more particularly there arises a problem that data recorded on the optical disk is destroyed.

SUMMARY OF THE INVENTION

The problem is solved by the present invention described in Claims.

According to the present invention, erasure of recorded data or destruction of the information recording layer caused by irradiating the information recording surface of the optical disk with excessive laser power upon information reproduction can be prevented for two kinds of optical disks having the same laser wavelength for use in reproduction and the different numerical apertures.

The causes for the above problem are now examined in detail.

When the optical disks having the standards that the wavelengths of the laser beam are the same and the numerical apertures of lens are different as the relation of the BD standards and the HD-DVD standards are defined as an optical disk 1 and an optical disk 2, respectively, and the relation of the numerical apertures of lens $NA_1$ and $NA_2$ is $NA_1 > NA_2$, the relations of the spot areas $S_1$ and $S_2$ of the laser beam on the optical disks and the reproduction laser powers $P_1$ and $P_2$ are given by the following two expressions:

$$S_1 < S_2 \quad \text{(expression 3)}$$

$$P_1 < P_2 \quad \text{(expression 4)}$$

There is considered an optical disk apparatus which can make reproduction for both the optical disks 1 and 2.

It will be understood from the expression 4 that the reproduction laser power is required to be changed when the optical disk 1 is reproduced and when the optical disk 2 is reproduced.

At this time, when a high-frequency signal having a preferable amplitude for the optical disk 2 is superposed in reproduction of the rewritable optical disk 1, there is a possibility that the irradiation energy per unit area reaches the erasure power of the optical disk 1, so that recorded data is erased. In other words, although the amplitude set value of the high-frequency signal does not cause the problem for a larger spot area $S_2$ on the optical disk 2, the problem is caused for the smaller spot area $S_1$ on the optical disk 1.

The cause is considered that energy per unit area given by the reproduction laser power $P_1$ and the peak power of the high-frequency signal superposed thereon is equal to energy per unit area given by the erasing laser power for the optical disk 1, so that recorded data is erased. This is considered to be the cause of the above-mentioned problem that the recorded data on the other optical disk is destroyed by irradiation of the excessive laser power.

On the other hand, when attention is paid to the specific laser, it has been found that the optimum amplitude and frequency of the high-frequency signal superposed in order to reduce laser noise depend on the laser power. That is, it has been found that it is desired to change the amplitude and frequency of the high-frequency signal when the laser power value is changed.

From the foregoing, when the numerical apertures are different in two kinds of the standards for optical disks using the laser having the same wavelength, that is, when it is necessary to change the reproduction laser power, it has been found that the characteristics (amplitude and frequency) of the high-frequency superposition are also required to be changed.

Embodiments for solving the above problems are now described in detail.

Other objects, features and advantages of the invention will become apparent from the following description of the embodiments of the invention taken in conjunction with the accompanying drawings.

DESCRIPTION OF THE EMBODIMENTS

Figure 1:
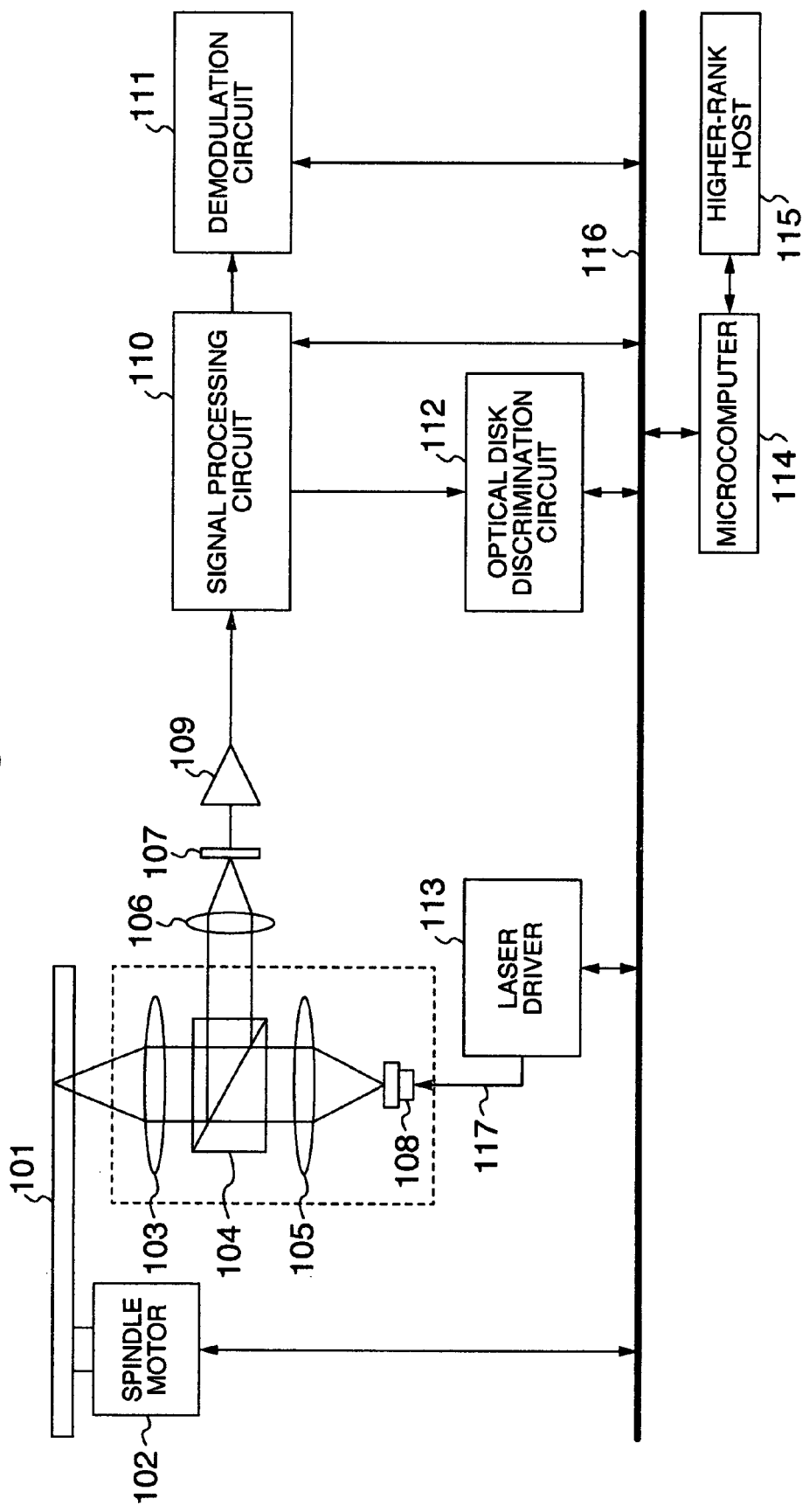
FIG. 1 is a schematic diagram illustrating an optical disk apparatus according to a first embodiment.

Referring now to FIG. 1, an optical disk apparatus according to a first embodiment is described. A laser beam emitted from a laser 108 passes through a collimate lens 105 and an objective lens 103 and impinges on a predetermined radial position of a recording medium 101. Reflected light of the laser beam enters a focusing lens 106 through a beam splitter 104 to be focused by the focusing lens 106 and is converted into an electrical signal (hereinafter referred to as "signal") by means of a photoelectric conversion element 107. The signal thus obtained is supplied through an I/V conversion circuit 109 and a signal processing circuit 110 to a demodulation circuit 111 to be decoded and is sent to a higher-rank host computer 115 through a microcomputer 114.

In discrimination of the optical disk, a signal necessary to discriminate the optical disk (hereinafter referred to as "optical disk discrimination signal") is supplied from the signal processing circuit 110 to an optical disk discrimination circuit 112. The optical disk discrimination signal is different depending on structure of the optical disk and contains, for example, a focus error signal and a tracking error signal.

The discrimination result of the optical disk outputted from the optical disk discrimination circuit 112 is supplied through a data bus 116 to the microcomputer 114. The microcomputer 114 controls the signal processing circuit 110, the demodulation circuit 111, a laser driver 113, a spindle motor 102 and the like on the basis of the discrimination result of the optical disk so that control for the discriminated optical disk is optimum.

Figure 2:
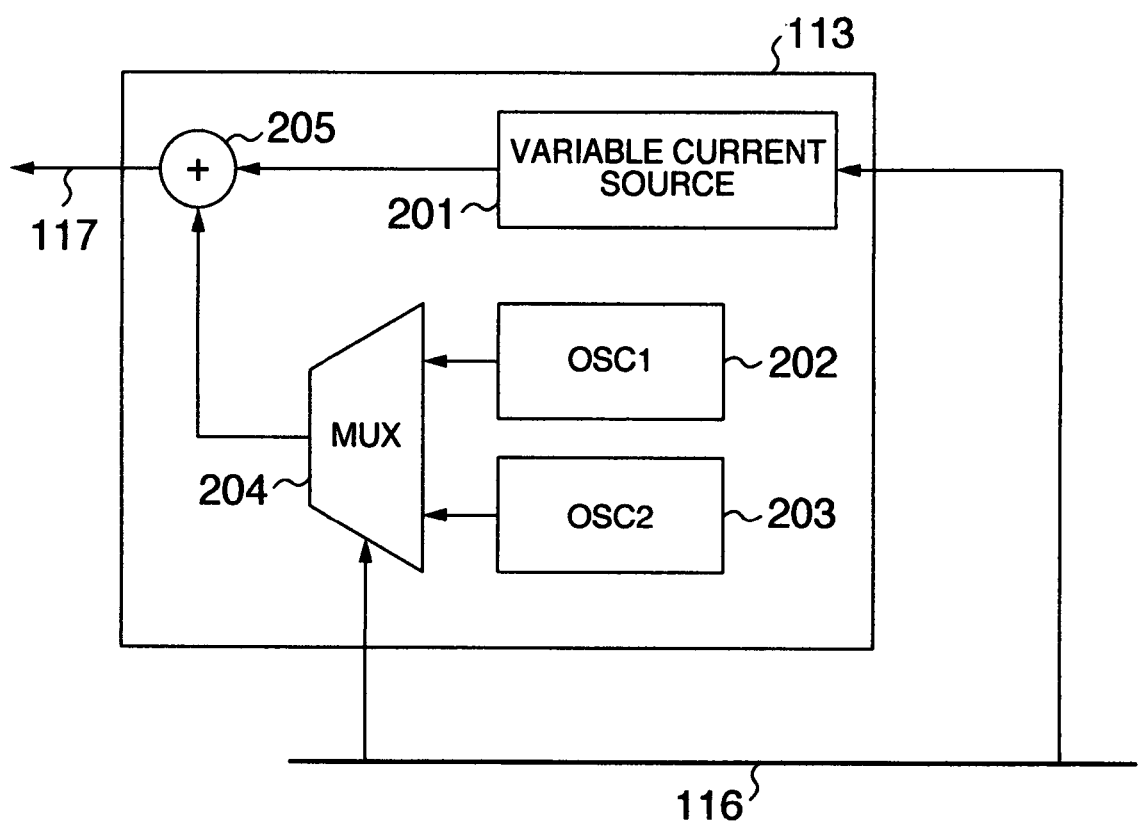
FIG. 2 is a block diagram schematically illustrating an internal configuration of a laser driver in the first embodiment.

Referring now to FIG. 2, the detailed configuration of the laser driver 113 in the optical disk apparatus of FIG. 1 is described. Numeral 201 denotes a variable current source controlled by the microcomputer 114 through the data bus 116. Numeral 202 denotes a first high-frequency current generation circuit (hereinafter referred to as "OSC1") and an amplitude and a frequency of the high-frequency current or signal produced by the OSC1 are described as "HFamp1" and "HFfreq1", respectively. Numeral 203 denotes a second high-frequency current generation circuit (hereinafter referred to as "OSC2") and an amplitude and a frequency of the high-frequency current or signal produced by the OSC2 are described as "HFamp2" and "HFfreq2", respectively. Numeral 204 denotes a signal selection circuit for selecting one of the outputs of the OSC1 and the OSC2 to supply it to an adder 205 and the signal selection circuit 204 is controlled by the microcomputer 114 through the data bus 116. Numeral 205 denotes the adder for adding the outputs of the variable current source 201 and the signal selection circuit 204 and the output of the adder 205 constitutes a laser driving current output 117 outputted by the laser driver 113.

Figures 3, 4:
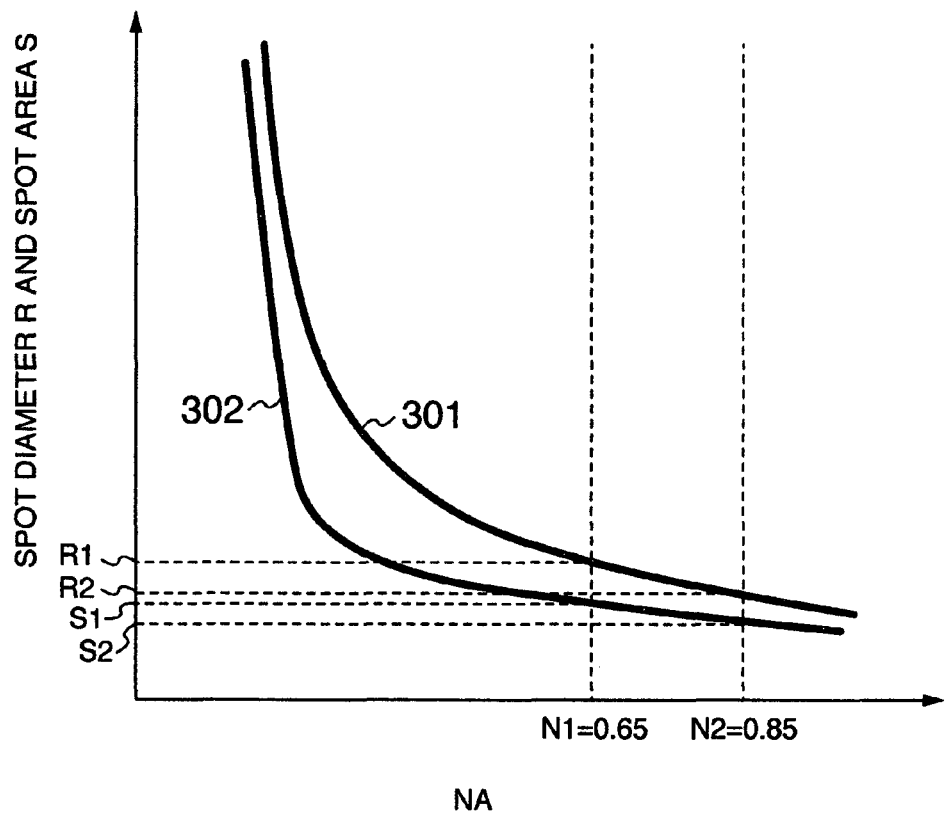
FIG. 3 is a graph showing the relation of numerical aperture NA of a laser beam and spot diameter R and spot area R formed on an optical disk.
FIG. 4 is a table showing parameters for two kinds of optical disks having the same reproduction laser wavelength and different numerical apertures.

Referring now to FIG. 3, the relation of numerical aperture NA of lens and spot diameter R and spot area S formed on the optical disk is described. The spot diameter R is inversely proportional to the numerical aperture NA as described in the expression 1 and this relation is shown by solid line 301. As described in the expression 2, the spot area S is inversely proportional to the square of the numerical aperture NA of lens and this relation is shown by solid line 302.

Figure 6:
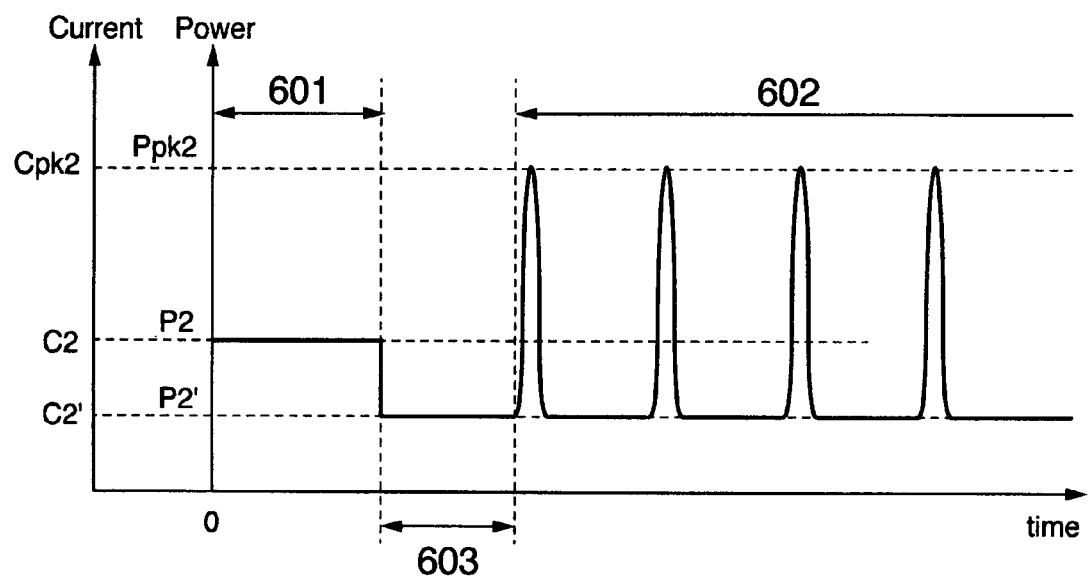
FIG. 6 is a schematic diagram showing laser beam waveform for an optical disk 2 in the first embodiment.

FIG. 6 shows the relation of the laser beam waveform and the laser beam power and the driving current value upon reproduction of the optical disk 2. During the period 601 that the high-frequency signal is not superposed, the laser power is P2 and the DC laser driving current is C2.

During the period 602 that the high-frequency signal is superposed, the signal selection circuit 204 shown in FIG. 2 selects the output of the OSC2 to be outputted. In order to make the average laser power during the period 602 equal to the laser power P2 during the period 601, C2' satisfying the following relation is required to be set in the variable current source 201 shown in FIG. 2.

$$Cpk2 = C2' + HFamp2 \quad \text{(expression 5)}$$

$$C2 = C2' + (HFamp2/HFfreq2) \quad \text{(expression 6)}$$

Figure 7:
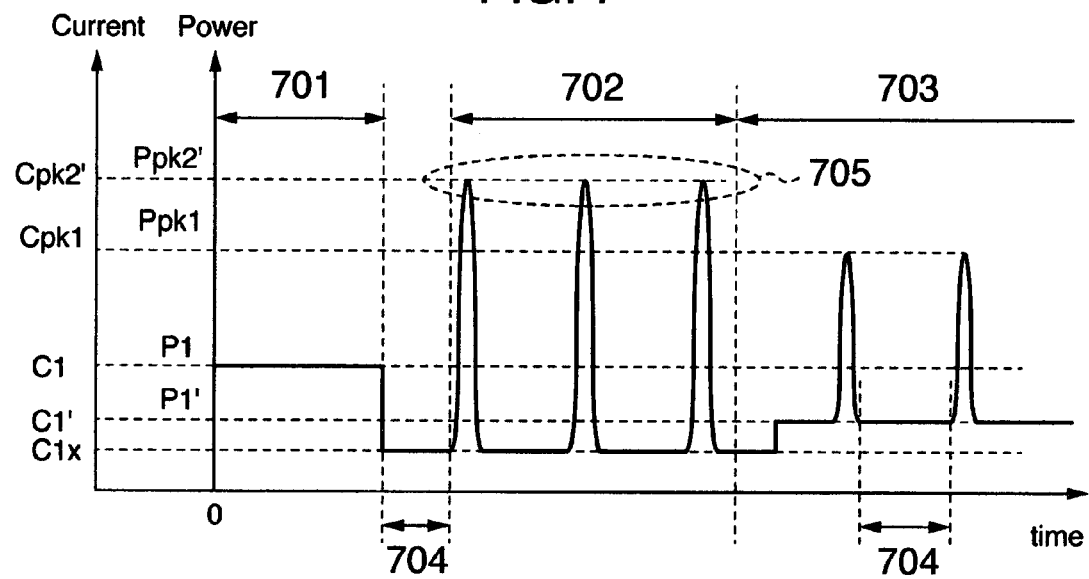
FIG. 7 is a schematic diagram showing laser beam waveform for an optical disk 1 in the first embodiment.

FIG. 7 shows the relation of the laser beam waveform and the laser beam power and the driving current value upon reproduction of the optical disk 1. During the period 701 that the high-frequency signal is not superposed, the laser power is P1 and the DC laser driving current is C1. The relation of the laser power P1 and the DC laser driving current C1 of FIG. 7 and the laser power P2 and the DC laser driving current C2 of FIG. 6 is given by:

$$P1 < P2 \quad \text{(expression 7)}$$

$$C1 < C2 \quad \text{(expression 8)}$$

Since the laser having the same wavelength and an optical pickup having the same optical path length are used for reproduction of the optical disks 1 and 2, it is supposed that the signal selection circuit 204 shown in FIG. 2 selects the output of the OSC2 to be outputted even during the period 702 that the high-frequency signal is superposed. In order to make the average laser power during the period 702 equal to the laser power P1 during the period 701, C1x satisfying the following relation is required to be set in the variable current source 201 shown in FIG. 2.

$$Cpk2' = C1x + HFamp2 \quad \text{(expression 9)}$$

$$C1 = C1x + (HFamp2/HFfreq2) \quad \text{(expression 10)}$$

As described in FIG. 4, the optical spot area for the optical disk 1 is about 0.6 times the optical spot area for the optical disk 2 and accordingly if the optical disk is irradiated with the same laser power, the laser power per unit area of the optical disk 1 is $1/0.6 \approx 1.7$ times as compared with the optical disk 2. Since the reproduction laser power C1 (0.3 mW) is set to about 0.6 times of the reproduction laser power C2 (0.5 mW), the laser powers per unit area for the average reproduction laser powers C1 and C2 are substantially equal.

However, when the influence on the increased laser power per unit area by the HFamp2 superposed during the period 702 is compared with the influence on the increased laser power per unit area by the HFamp2 superposed during the period 602, the former is larger than the latter and accordingly the laser power per unit area at the high-frequency peak part during the period 702 is sometimes larger than that during the period 602. In other words, there is a possibility that the recording layer of the optical disk 1 is irradiated with excessive laser power depending on the set value of the HFamp2 and there is a possibility that the recorded data is destroyed or the recording layer of the optical disk is deteriorated at part 705 shown in FIG. 7.

In order to avoid such problem, the signal selection circuit 204 shown in FIG. 2 selects the output of the OSC1 to be outputted so that the relation of the laser beam waveform, the laser beam power and the driving current value in the period 703 is satisfied upon reproduction of the optical disk 1. At this time, "HFamp1" and "HFfreq1" outputted by the OSC1 are set as follows:

$$HFamp1 = HFamp2 \times (P1/P2) \quad \text{(expression 11)}$$

$$HFfreq1 = HFfreq2 \quad \text{(expression 12)}$$

When the average beam power P1 and the average driving current C1 are realized so as to satisfy the above condition, the laser beam waveform by the high-frequency superposition is similar to that in the period 602 of FIG. 6 as shown in the period 703 of FIG. 7 and the laser powers per unit area for the high-frequency superposed peak power Ppk1 and the high-frequency superposed peak power Ppk2 of FIG. 6 are substantially equal to each other.

Figure 5:
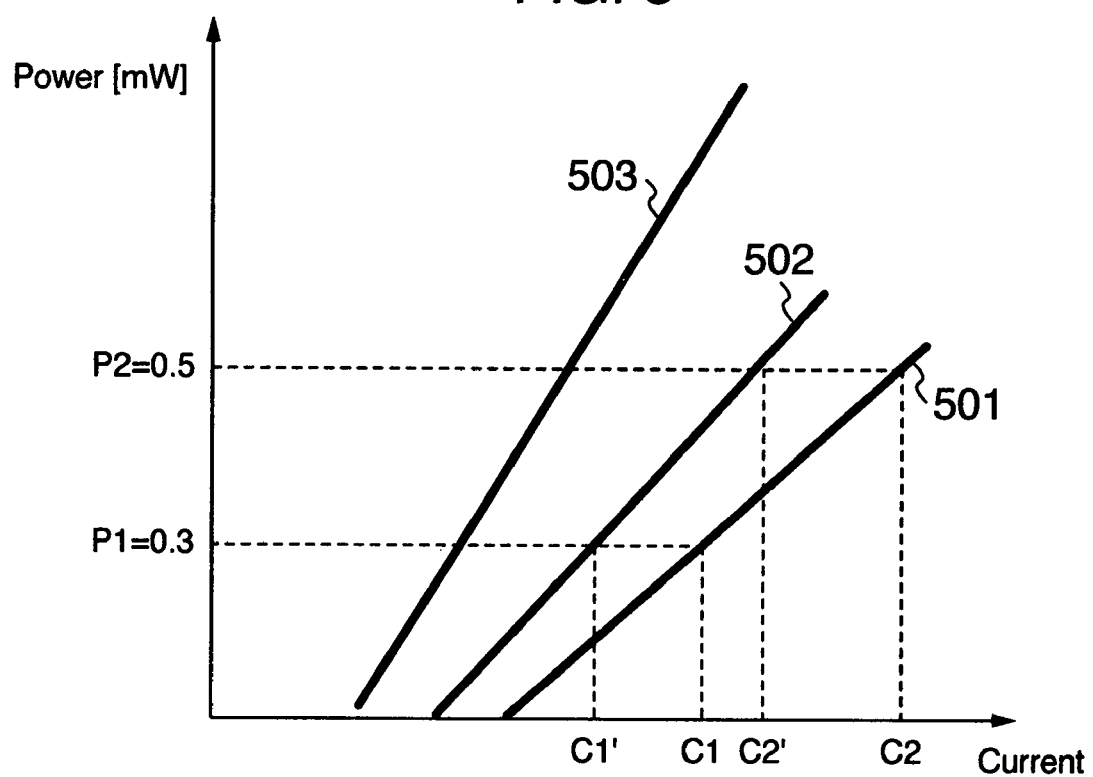
FIG. 5 is a graph showing the relation of laser driving current and laser beam power by the driving current.

FIG. 5 shows the relation of the laser driving current and the laser beam power by the laser driving currents (hereinafter referred to as "I/L relation"). Solid line 501 shows the relation of the average laser power and the average driving current in the period that the high-frequency signal is not superposed on the laser driving current as shown in the period 603 of FIG. 6 and the period 703 of FIG. 7. Further, solid line 502 shows the relation of the average laser power and the average laser driving current in the period that the high-frequency signal is superposed on the laser driving current as shown in the period 602 of FIG. 6, the periods 702 and 703 of FIG. 7, for example. Solid line 503 shows the relation of the high-frequency superposed peak power value and the laser driving current at that time.

When the laser beam waveforms upon the high-frequency superposition are similar to each other as shown in the periods 602 and 703, the power values such as the peak laser power average value of the superposed high-frequency signal are put on the same straight line in the area where the laser power is changed linearly to the driving current. Accordingly, the relation of I/L at each level of Ppk1 and Ppk2 is previously calculated and the laser power and the laser driving current value at each level may be set in accordance with the laser spot diameter on the recording surface of the optical disk to be reproduced.

Figure 8:
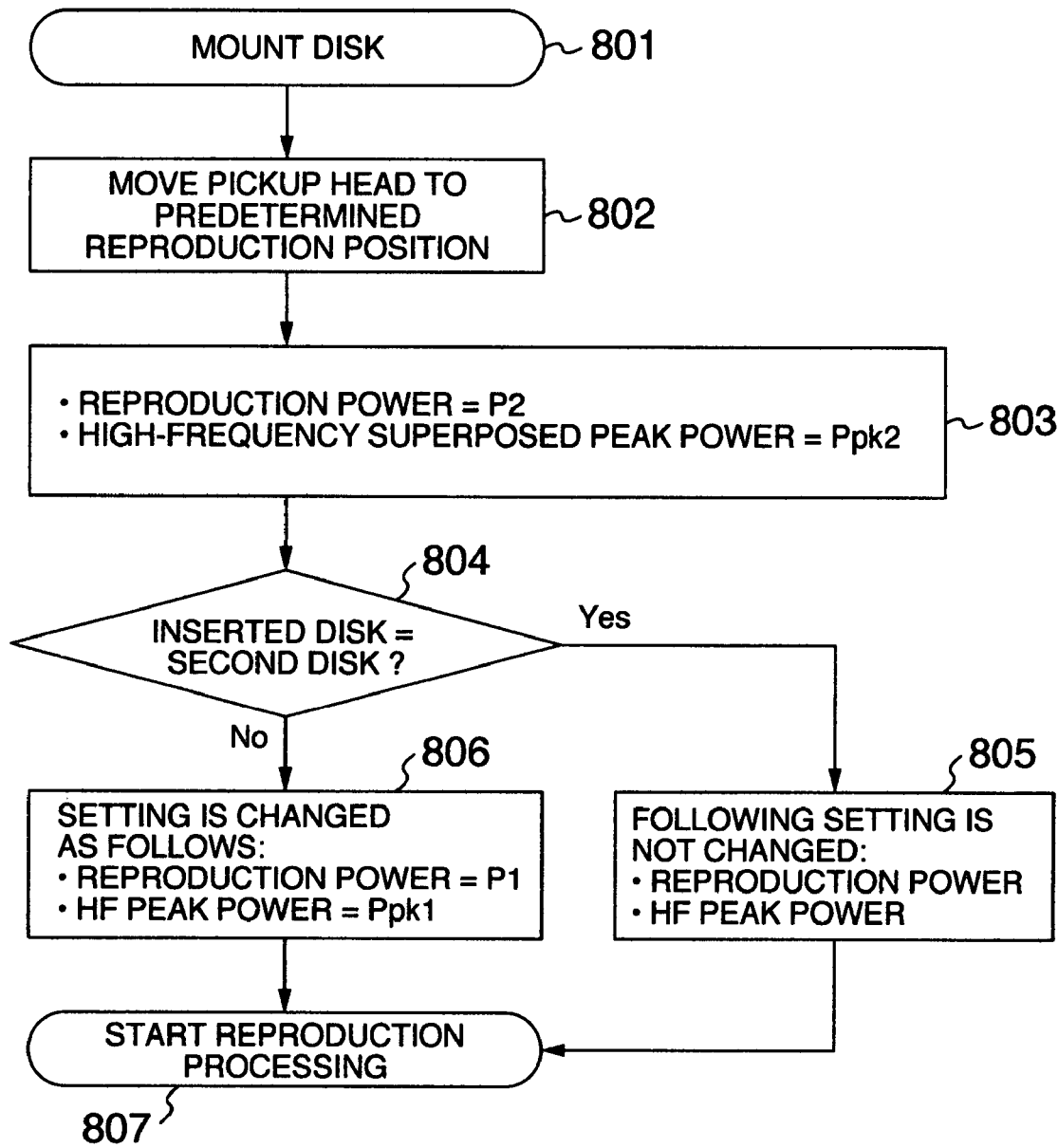
FIG. 8 is a flow chart showing a processing procedure to start reproduction of the optical disk in the first embodiment.

FIG. 8 is a flow chart showing processing of the embodiment. When the optical disk is mounted in the optical disk apparatus (step 801), an optical pickup head is moved to a predetermined reproduction position in order to prevent data recorded on the optical disk from being destroyed (step 802) and setting of reproduction for the optical disk 2 is made as described by expressions 13, 14 and 15 (step 803). Then, it is judged whether the optical disk is the optical disk 2 or not (step 804). At this time, the signal selection circuit 204 shown in FIG. 2 selects the output of the OSC2 to be outputted.

$$\text{Numerical Aperture} = NA2 \quad \text{(expression 13)}$$

$$\text{Reproduction Power} = P2 \quad \text{(expression 14)}$$

$$\text{High-Frequency Superposed Peak Power} = Ppk2 \quad \text{(expression 15)}$$

The reason why the kind of the optical disk is discriminated in the setting of reproduction for the optical disk 2 is that the optical spot diameter for the optical disk 2 is larger than that for the optical disk 1 and accordingly the laser power per unit area on the optical disk is reduced even if the high-frequency superposed peak power is the same, so that destruction of the recorded data can be avoided.

In judgment step 804, when the optical disk is judged to be the optical disk 2 (step 805), the reproduction processing of data is started in accordance with the setting defined by the expressions 5 and 6 (step 807).

In judgment step 804, when the optical disk is judged not to be the optical disk 2, that is, when it is judged to be the optical disk 1 (step 806), the reproduction condition of the optical disk 1 is set in accordance with the expressions 9 and 10 and the following expressions and the reproduction processing is started (step 807).

$$\text{Numerical Aperture} = NA1 \quad \text{(expression 16)}$$

$$\text{Reproduction Power} = P1 \quad \text{(expression 17)}$$

$$\text{High-Frequency Superposed Peak Power} = Ppk1 \quad \text{(expression 18)}$$

In the embodiment, the optical disk 1 conforming to the BD standards and the optical disk 2 conforming to the HD-DVD standards are illustrated as the optical disks having the same laser wavelength to be reproduced and different reproduction laser spot areas, although it is needless to say that the present invention can be applied even to the optical disks having the same relation.

Further, in the embodiment, the amplitude "HFamp1" of the high-frequency superposed signal of the optical disk 1 is calculated by the expression 11, although the amplitude HFamp1 satisfying the following conditions may be set:
1. when the optical disk is rewritable, the high-frequency superposed peak power Ppk1 is smaller than erasing power; and
2. when the optical disk is of the read only type or of once recordable type, the high-frequency superposed peak power Ppk1 is power by which the data recording layer is not destroyed.

In FIG. 2, the OSC1 (202), the OSC2 (203) and the signal selection circuit 204 are disposed within the laser driver 113, although any or all of them may be disposed outside of the laser driver 113. According to such configuration, the laser driver can be made small and the heat generation amount can be reduced.

Further, the processing in step 802 of FIG. 8 may be omitted. Consequently, the judgment or discrimination time of the disk can be shortened.

In step 803 of FIG. 8, the optical disk is judged or discriminated after the setting of the high-frequency superposition, although the optical disk may be discriminated without superposing the high-frequency signal. In this case, the reproduction power P2 and the high-frequency superposed peak power Ppk2 may be set in step 805.

Figure 13:
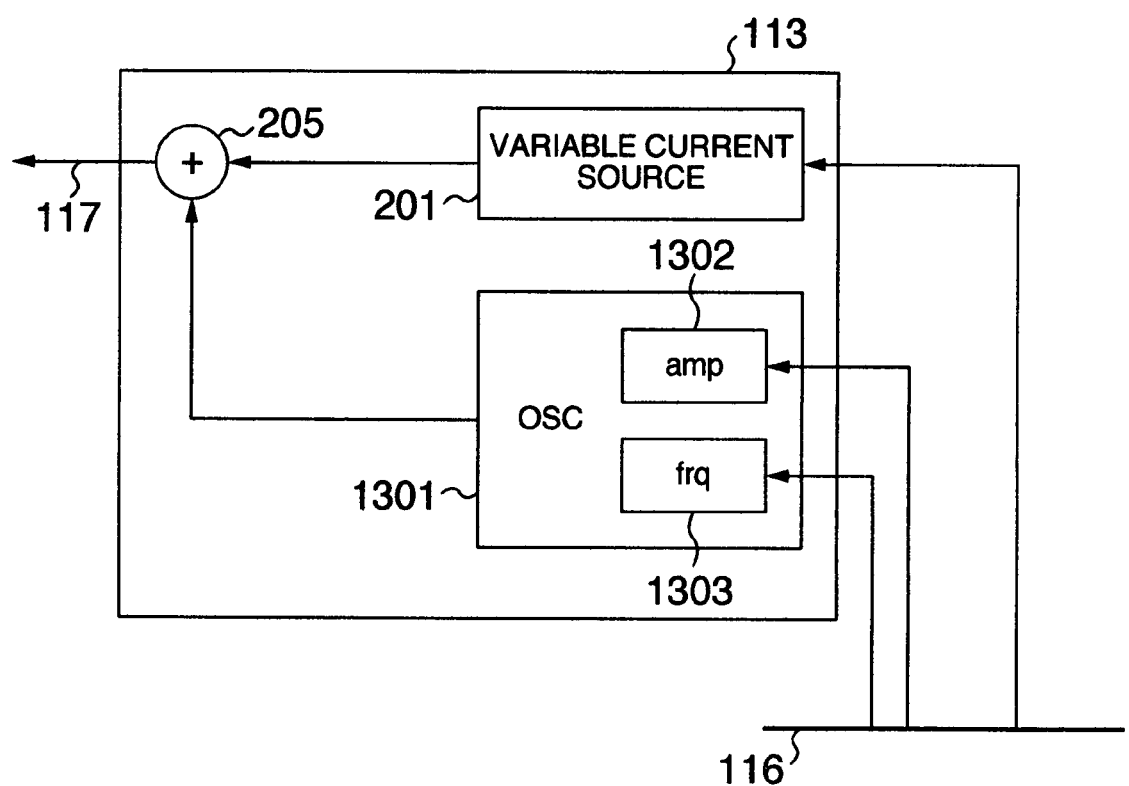
FIG. 13 is a block diagram schematically illustrating an internal configuration of a laser driver in a second embodiment.

Referring now to FIG. 13, a second embodiment is described. In this embodiment, there is provided a high-frequency current generation circuit 1301 which can set a high-frequency current amplitude and high frequency from the outside of the laser driver, so that the amplitude and the frequency of the high-frequency signal to be superposed can be changed in accordance with the discrimination result of the optical disk instead of the plurality of high-frequency current generation circuits (OSC1, OSC2) provided in the laser driver as shown in FIG. 2 of the first embodiment. The configuration of the optical disk apparatus of the second embodiment is the same as that of the first embodiment as shown in FIG. 1 and accordingly description thereof is omitted.

FIG. 13 is a block diagram schematically illustrating an internal configuration of the laser driver 113 of the embodiment. Description of the elements 201 and 205 common to those in FIG. 2 of the first embodiment is omitted. The high-frequency current generation circuit 1301 includes a current amplitude control circuit 1302 for controlling a current amplitude of the high-frequency signal and a frequency control circuit 1303 for controlling the frequency of the high-frequency signal and both of them are controlled by the microcomputer 114 through the data bus 116. A control value of variable current source 201, the current amplitude control circuit 1302 is set so that the average of the reproduction laser power is equal to the optimum reproduction laser power in accordance with the kind of the optical disk discriminated by the optical disk discrimination circuit 112.

For example, when the optical disk is judged to be the optical disk 1, the setting for the current amplitude control part 1302 is set to HFamp1 and when the optical disk is judged to be the optical disk 2, the setting for the current amplitude control part 1302 is set to HFamp2. At this time, when the setting for the frequency control part 1303 is set to be HFfreq2=HFfreq1 in either case, the same effects as in the first embodiment can be attained.

A third embodiment of the present invention is now described.

Figure 9:
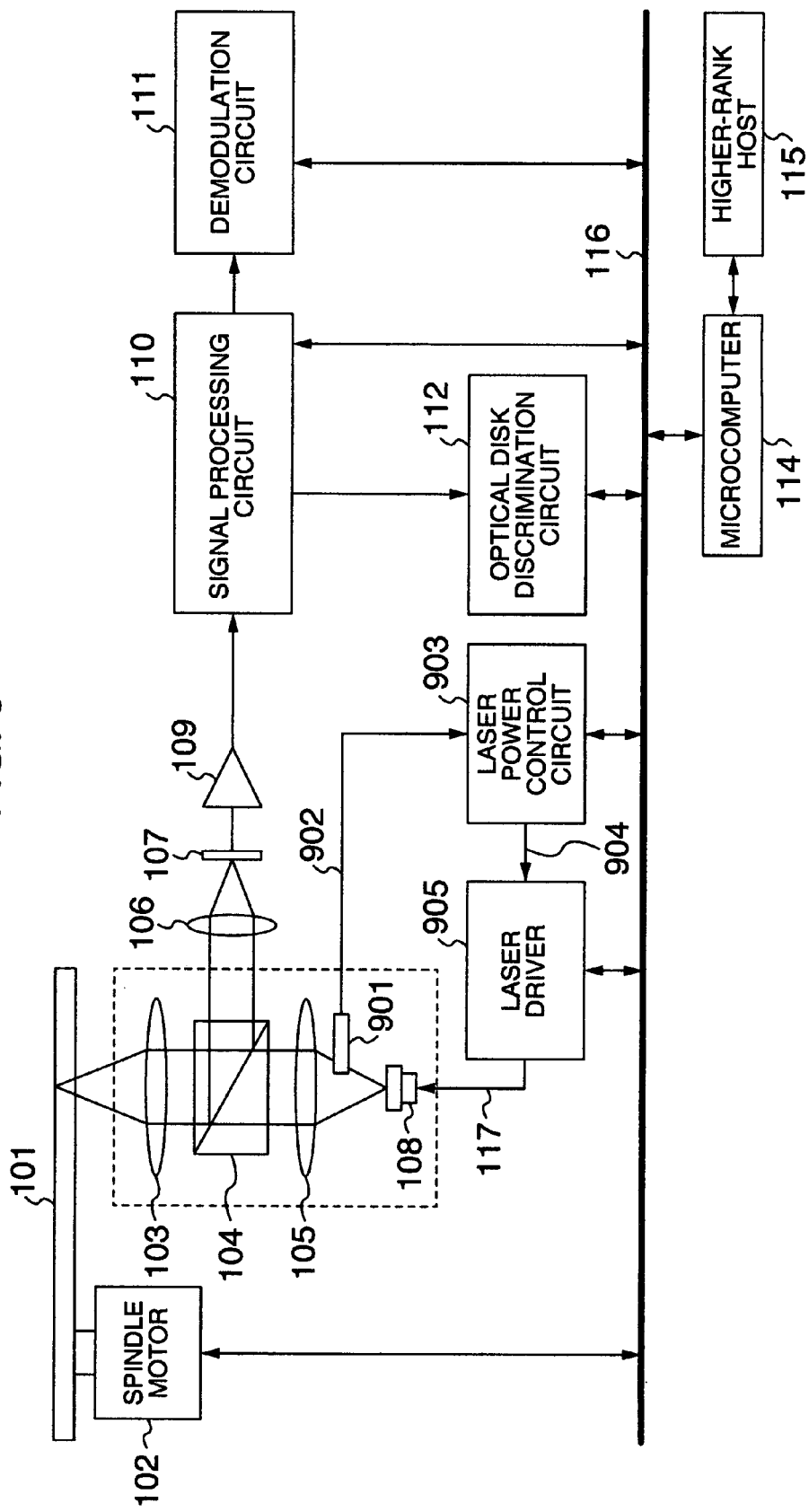
FIG. 9 is a schematic diagram illustrating an optical disk apparatus according to a third embodiment.
Figure 10:
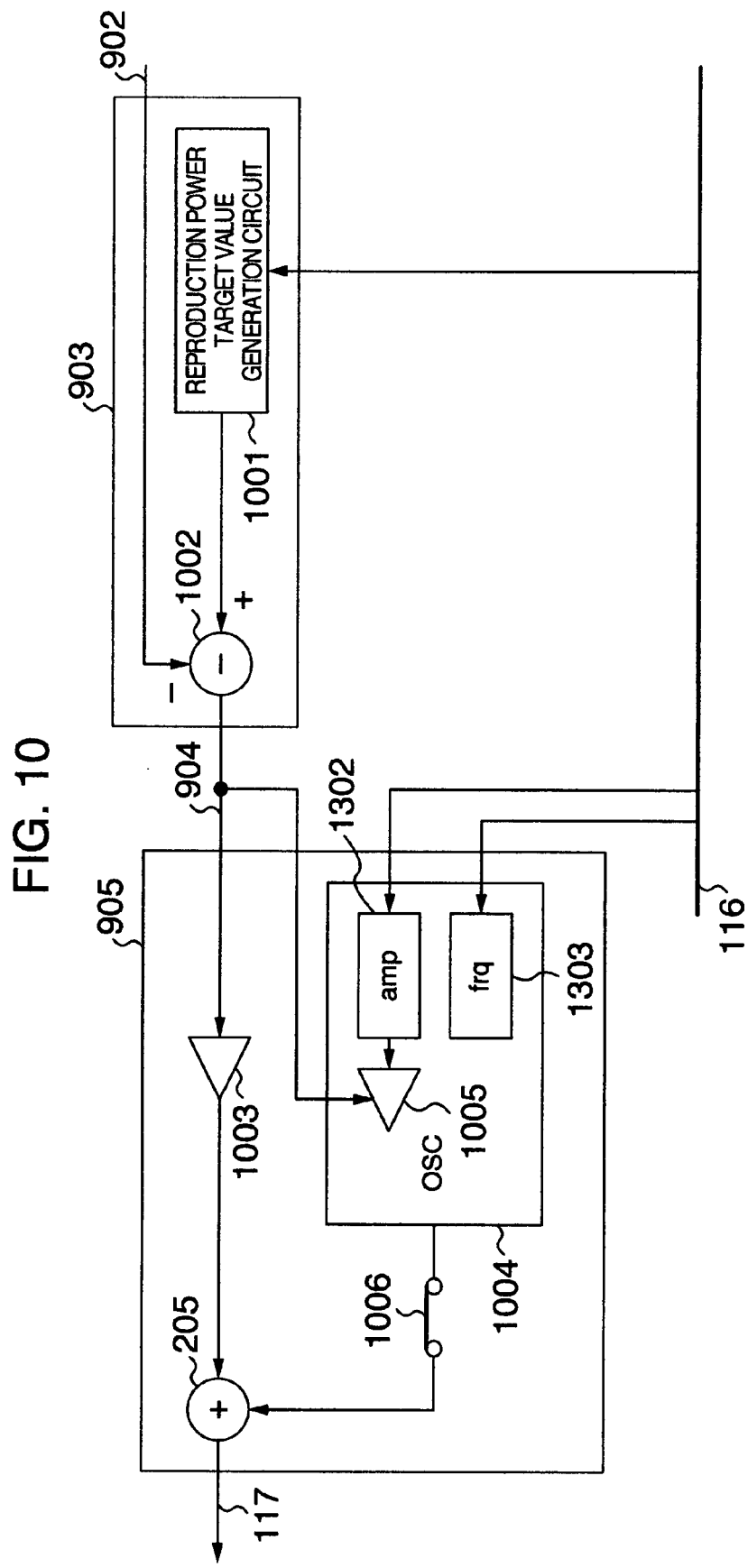
FIG. 10 is a block diagram schematically illustrating an internal configuration of a laser power control circuit and a laser driver in the third embodiment.

FIG. 9 is a schematic diagram illustrating an optical disk apparatus according to a third embodiment of the present invention. The like elements to those shown in FIG. 1 are designated by like numerals and description thereof is omitted. Numeral 901 denotes a monitor diode for detecting laser emission power in order to perform the automatic power control (APC) and the signal band of the monitor diode is sufficiently low as compared with the high-frequency signal superposed on the reproduction laser beam. The signal 902 detected by the monitor diode 901 is supplied to a laser power control circuit 903. The detailed configuration of the laser power control circuit 903 and a laser driver 905 is shown in FIG. 10. The like elements to those shown in FIG. 13 are designated by like numerals and description thereof is omitted.

In the laser power control circuit 903, a reproduction laser power target value corresponding to the optical disk is set to a reproduction power target value generation circuit 1001 by the microcomputer 114 in accordance with the discrimination result of the optical disk by the optical disk discrimination circuit 112. A difference between this set value and an output 902 of the monitor diode is calculated by a subtractor 1002 to be outputted as a difference value 904. The reproduction laser driving current is generated on the basis of the difference value 904 through an amplifier 1003. Further, in a high-frequency current generation circuit 1004, a variable gain amplifier 1005 controlled by the difference value 904 controls the amplitude set value with respect to the amplitude value set in the high-frequency amplitude control circuit 1302 in accordance with the output of the optical disk discrimination circuit 112. The coefficient ratio of the variable gain amplifier to the difference value 904 may be the ratio of values shown by the solid lines 502 and 503 in FIG. 5 of the first embodiment, for example. Consequently, satisfactory high-frequency superposition corresponding to the optical disk reproduction power can be realized and mis-erasure of data upon reproduction can be prevented while correcting change in the relation of I/L due to change in temperature within the optical disk apparatus and at the periphery of laser and deterioration due to aging.

Figure 11:
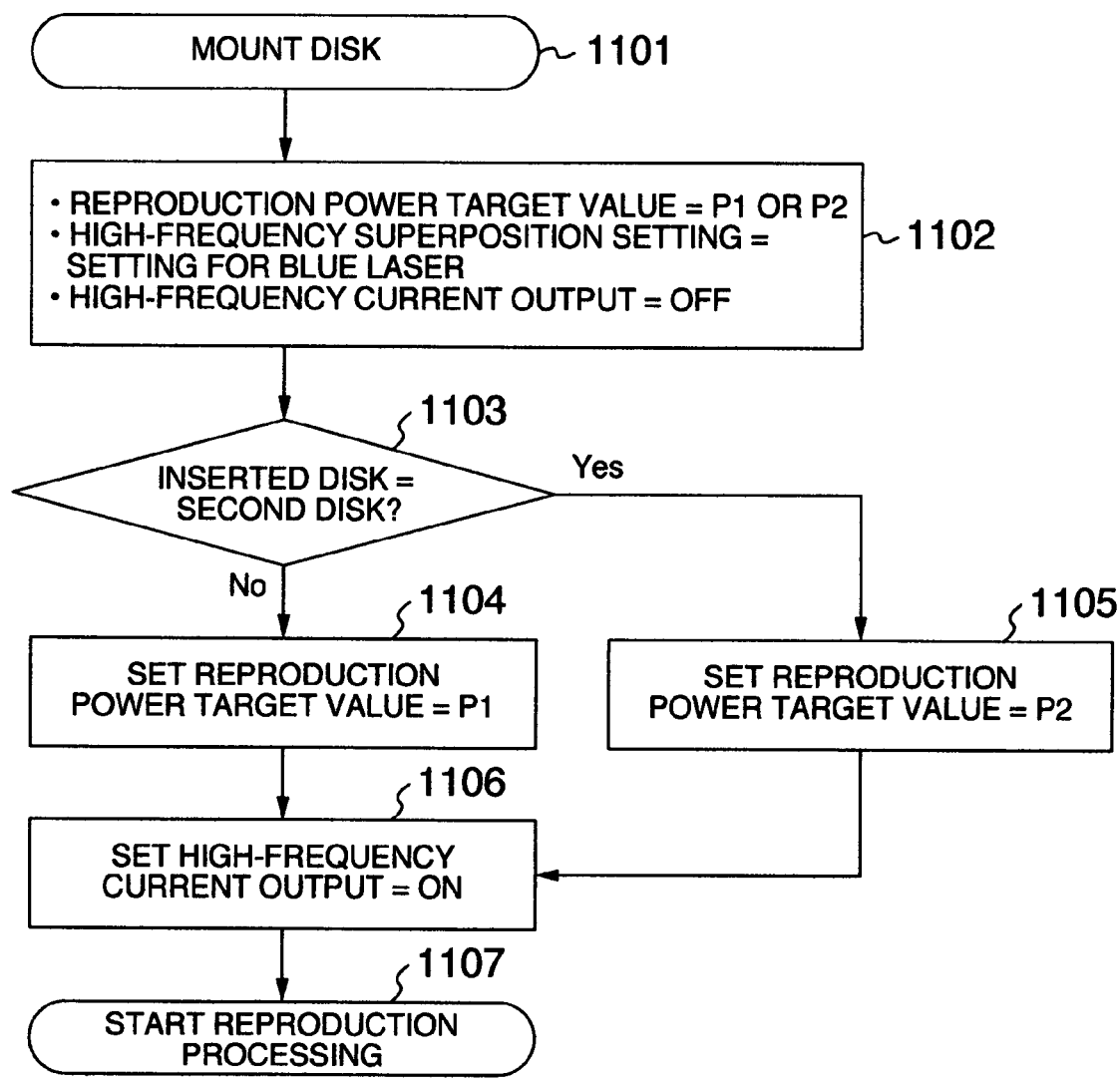
FIG. 11 is a flow chart showing a processing procedure to start reproduction of the optical disk in the third embodiment.

FIG. 11 is a flow chart showing processing of the embodiment. When the optical disk is mounted (step 1101), the setting for the target value of the reproduction power target value generation circuit 1001 is set to P1 or P2 of FIG. 5 and the setting for the amplitude and the frequency of the high-frequency current generation circuit 1004 are set in common to the first and second optical disks 1, 2. In the embodiment, the setting based on the blue laser is made and a switch 1006 shown in FIG. 10 is turned off, so that the output of the high-frequency current generation circuit 1004 is cut off. In this state, laser noise is superposed on the reproduction signal and accordingly the signal quality (S/N) is deteriorated, although the signal band of the focus error signal and the tracking error signal used mainly in discrimination of the optical disk is as sufficiently low as several kHz, so that the signal quality can be relatively easily improved by means of a low-pass-filter (LPF) or the like. By using the signal having the quality thus improved, the optical disk can be discriminated with performance of the same degree as that of the discrimination of the optical disk using the reproduction waveform on which the high-frequency signal is superposed. The high-frequency signal is not superposed as described above, so that mis-erasure of the recorded data on the optical disk and deterioration of the recording layer of the optical disk at the time that the peak power of the laser beam is excessive upon the high-frequency superposition can be avoided. In this state, discrimination of the optical disk is carried out (step 1102) and when the optical disk is judged to be the optical disk 2 (Yes of step 1103), the target value of the reproduction power target value generation circuit 1001 of FIG. 10 is set to the reproduction power P2 of the optical disk 2 (step 1105). When it is judged not to be the optical disk 2, that is, when it is judged to be the optical disk 1 (No of step 1103), the target value of the reproduction power target value generation circuit 1001 of FIG. 10 is set to the reproduction power P1 of the optical disk 1 (step 1104). Then, the output of the high-frequency current generation circuit 1004 is made effective by the switch 1006 (step 1106) and the reproduction processing is started (step 1107).

Figure 12:
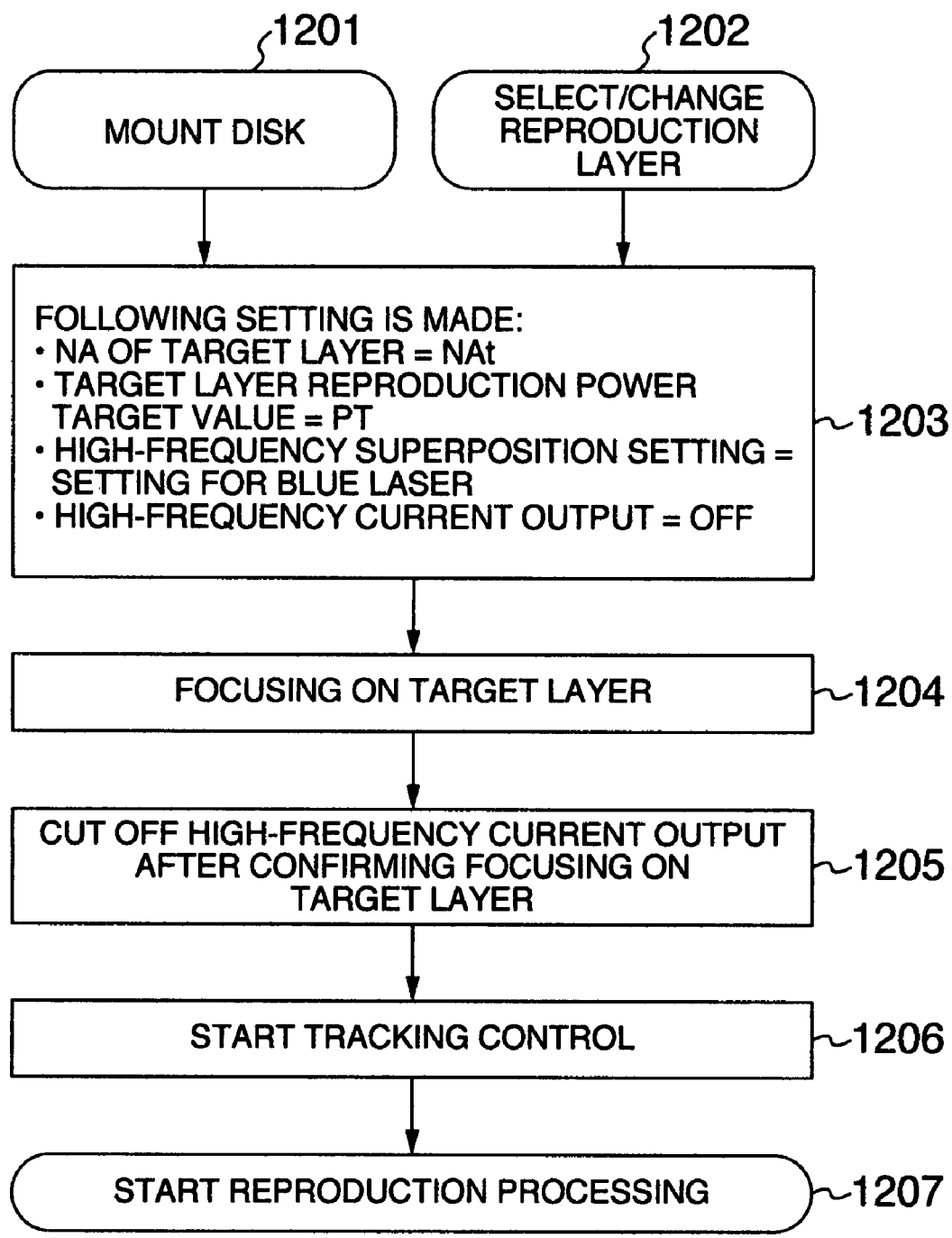
FIG. 12 is a flow chart showing a processing procedure to start reproduction of the optical disk in a fourth embodiment.

FIG. 12 is a flow chart showing processing of a fourth embodiment of the present invention. The circuit configuration of the embodiment is the same as that of the third embodiment and description thereof is omitted. In the embodiment, there is considered the case where the numerical aperture NA in reproduction is different in each layer of a multi-layer optical disk in which the blue laser is used to reproduce information. When the optical disk is mounted (step 1201) or when the reproduction layer of the optical layer is changed (step 1202), the following setting is made (step 1203) as preparation for reproduction of a layer to be reproduced (hereinafter referred to as "target layer"):

NA of the target layer=NAt the reproduction power Pt of the target layer is set to the target value of the reproduction power target value generation circuit 1001 of FIG. 10.

At this time, the switch 1006 of FIG. 10 is turned off, so that the output of the high-frequency current generation circuit is cut off. Then, focusing on the target layer is made (step 1204). When the focusing on the target layer can be confirmed, the switch 1006 is turned on to make effective the output of the high-frequency current generation circuit (step 1205). Then, start tracking control (step 1206) and the reproduction processing is started (step 1207). Consequently, destruction of the data recorded on the layer other than the target layer or deterioration of the recording layer caused by the high-frequency superposed peak power upon the focusing can be prevented.

In the embodiments, the high-frequency signal is superposed on the laser driving signal upon reproduction, although it is needless to say that the present invention described in the embodiments can be applied even when reproduction is made for generation of a servo signal in recording or when the laser beam of the reproduction power level is emitted upon formation of space in recording.

Further, in the embodiments, the characteristics of the high-frequency signal superposed on the laser driving signal upon reproduction are changed, although the output of the high-frequency signal may be stopped if circumstances require, that is, the high-frequency signal having an amplitude reduced to zero may be used and the high-frequency signal is not limited to the waveform as shown in FIGS. 6 and 7.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disk apparatus which reproduces first and second optical disks, comprising:
a laser to emit a laser beam having a predetermined wavelength;
a first objective lens to focus the laser beam having the predetermined wavelength emitted from the laser on the first optical disk and having a first numerical aperture;
a second objective lens to focus the laser beam having the predetermined wavelength emitted from the laser on the second optical disk and having a second numerical aperture;
an optical disk discrimination circuit to discriminate a kind of the optical disk mounted; and
a laser driver to supply a laser driving current on which a first high-frequency current having a first amplitude and a first frequency is superposed to the laser when the first optical disk is mounted and to supply a laser driving current on which a second high-frequency current having a second amplitude and a second frequency is superposed to the laser when the second optical disk is mounted,
wherein the laser driver supplies a laser driving current on which no high-frequency current is superposed to the laser when the optical disk discrimination circuit discriminates the kind of the optical disk before the optical disk apparatus reproduces information on the optical disk, and supplies a laser driving current on which the first or second high-frequency current is superposed to the laser after the optical disk discrimination circuit discriminates the kind of the optical disk.

2. An optical disk apparatus according to claim 1, wherein the laser driver includes:
a first high-frequency current generation circuit to generate the first high-frequency current having the first amplitude and the first frequency;
a second high-frequency current generation circuit to generate the second high-frequency current having the second amplitude and the second frequency; and
a signal selection circuit to selectively output an output of the first high-frequency current generation circuit or an output of the second high-frequency current generation circuit.

3. An optical disk apparatus according to claim 1, wherein the laser driver includes a high-frequency current generation circuit which can change amplitude and frequency of a high-frequency current on the basis of an external control signal to generate the first or second high-frequency current.

4. An optical disk apparatus which reproduces first and second optical disks, comprising:
a laser to emit a laser beam having a predetermined wavelength;
a first objective lens to focus the laser beam having the predetermined wavelength emitted from the laser on the first optical disk and having a first numerical aperture;
a second objective lens to focus the laser beam having the predetermined wavelength emitted from the laser on the second optical disk and having a second numerical aperture;
an optical disk discrimination circuit to discriminate a kind of the optical disk mounted; and
a laser driver to supply a laser driving current on which a first high-frequency current having a first amplitude and a first frequency is superposed to the laser when the optical disk is reproduced using the laser beam having a first spot diameter through the first objective lens and to supply a laser driving current on which a second high-frequency current having a second amplitude and a second frequency is superposed to the laser when the optical disk is reproduced using the laser beam having a second spot diameter through the second objective lens,
wherein the laser driver supplies a laser driving current on which no high-frequency current is superposed to the laser when the optical disk discrimination circuit discriminates the kind of the optical disk before the optical disk apparatus reproduces information on the optical disk, and supplies a laser driving current on which the first or second high-frequency current is superposed to the laser after the optical disk discrimination circuit discriminates the kind of the optical disk.

5. An optical disk apparatus according to claim 4, wherein the laser driver includes:
a first high-frequency current generation circuit to generate the first high-frequency current having the first amplitude and the first frequency;
a second high-frequency current generation circuit to generate the second high-frequency current having the second amplitude and the second frequency; and a signal selection circuit to selectively output an output of the first high-frequency current generation circuit or an output of the second high-frequency current generation circuit.

6. An optical disk apparatus according to claim 4, wherein the laser driver includes a high-frequency current generation circuit which can change amplitude and frequency of a high-frequency current on the basis of an external control signal to generate the first or second high-frequency current.

7. An optical disk apparatus which reproduces first and second optical disks, comprising:
a laser to emit a laser beam having a predetermined wavelength;
a first objective lens to focus the laser beam having the predetermined wavelength emitted from the laser on the first optical disk and having a first numerical aperture;
a second objective lens to focus the laser beam having the predetermined wavelength emitted from the laser on the second optical disk and having a second numerical aperture;
an optical disk discrimination circuit to discriminate a kind of the optical disk mounted; and
a laser driver to supply a laser driving current on which a first high-frequency current having a first amplitude and a first frequency is superposed to the laser when the optical disk is reproduced using the laser beam having a first average laser power and to supply a laser driving current on which a second high-frequency current having a second amplitude and a second frequency is superposed to the laser when the optical disk is reproduced using the laser beam having a second average laser power,
wherein the laser driver supplies a laser driving current on which no high-frequency current is superposed to the laser when the optical disk discrimination circuit discriminates the kind of the optical disk before the optical disk apparatus reproduces information on the optical disk, and supplies a laser driving current on which the first or second high-frequency current is superposed to the laser after the optical disk discrimination circuit discriminates the kind of the optical disk.

8. An optical disk apparatus according to claim 7, wherein the laser driver includes:
a first high-frequency current generation circuit to generate the first high-frequency current having the first amplitude and the first frequency;
a second high-frequency current generation circuit to generate the second high-frequency current having the second amplitude and the second frequency; and
a signal selection circuit to selectively output an output of the first high-frequency current generation circuit or an output of the second high-frequency current generation circuit.

9. An optical disk apparatus according to claim 7, wherein the laser driver includes a high-frequency current generation circuit which can change amplitude and frequency of a high-frequency current on the basis of an external control signal to generate the first or second high-frequency current.

10. An optical disk apparatus according to claim 7, further comprising
a monitor diode to observe laser power of the laser beam emitted from the laser, and
wherein
the laser driver is controlled on the basis of average laser power observed by the monitor diode.

11. An optical disk apparatus which reproduces a first recording layer disposed at a first distance from a surface of an optical disk and a second recording layer disposed at a second distance from the surface of the optical disk, comprising:
a laser to emit a laser beam having a predetermined wavelength;
a first objective lens to focus the laser beam having the predetermined wavelength emitted from the laser on the first recording layer and having a first numerical aperture;
a second objective lens to focus the laser beam having the predetermined wavelength emitted from the laser on the second recording layer and having a second numerical aperture; and
a laser driver to supply a laser driving current on which a first high-frequency current having a first amplitude and a first frequency is superposed to the laser when the first recording layer is reproduced and to supply the laser driving current on which a second high-frequency current having a second amplitude and a second frequency is superposed to the laser when the second recording layer is reproduced,
wherein the laser driver supplies a laser driving current on which no high-frequency current is superposed to the laser when the kind of the optical disk is discriminated before the optical disk apparatus reproduces information on the optical disk, and supplies a laser driving current on which the first or second high-frequency current is superposed to the laser when the first or second recording layer is reproduced.

12. An optical disk apparatus according to claim 11, wherein
the laser driver includes:
a first high-frequency current generation circuit to generate the first high-frequency current having the first amplitude and the first frequency;
a second high-frequency current generation circuit to generate the second high-frequency current having the second amplitude and the second frequency; and
a signal selection circuit to selectively output an output of the first high-frequency current generation circuit or an output of the second high-frequency current generation circuit.

13. An optical disk apparatus according to claim 11, wherein
the laser driver includes a high-frequency current generation circuit which can change amplitude and frequency of a high-frequency current on the basis of an external control signal to generate the first or second high-frequency current.

14. A method of reproducing first and second optical disks, comprising:
supplying a laser driving current on which a high-frequency current having a first amplitude and a first frequency is superposed to a laser when the first optical disk is mounted;
supplying a laser driving current on which the high-frequency current having a second amplitude and a second frequency is superposed to the laser when the second optical disk is mounted;
supplying a laser driving current on which no high-frequency current is superposed to the laser when the kind of the optical disk is discriminated before the optical disk apparatus reproduces information on the optical disk; and supplying a laser driving current on which the high-frequency current is superposed to the laser after the kind of the optical disk is discriminated.

15. A method of reproducing first and second optical disks, comprising:
- supplying a laser driving current on which a high-frequency current having a first amplitude and a first frequency is superposed to a laser when the optical disk is reproduced using a laser beam having a first spot diameter;
- supplying a laser driving current on which the high-frequency current having a second amplitude and a second frequency is superposed to the laser when the optical disk is reproduced using the laser beam having a second spot diameter;
- supplying a laser driving current on which no high-frequency current is superposed to the laser when the kind of the optical disk is discriminated before the optical disk apparatus reproduces information on the optical disk; and
- supplying a laser driving current on which the high-frequency current is superposed to the laser after the kind of the optical disk is discriminated.

16. A method of reproducing first and second optical disks, comprising:
- supplying a laser driving current on which a high-frequency current having a first amplitude and a first frequency is superposed to a laser when the optical disk is reproduced using a laser beam having first average laser power;
- supplying a laser driving current on which the high-frequency current having a second amplitude and a first frequency is superposed to the laser when the optical disk is reproduced using the laser beam having second average laser power;
- supplying a laser driving current on which no high-frequency current is superposed to the laser when the kind of the optical disk is discriminated before the optical disk apparatus reproduces information on the optical disk; and
- supplying a laser driving current on which the high-frequency current is superposed to the laser after the kind of the optical disk is discriminated.

17. An optical disk reproduction method of reproducing a first recording layer disposed at a first distance from a surface of an optical disk and a second recording layer disposed at a second distance from the surface of the optical disk, comprising:
- supplying a laser driving current on which a high-frequency current having a first amplitude and a first frequency is superposed to a laser when the first recording layer is reproduced; and
- supplying a laser driving current on which the high-frequency current having a second amplitude and a second frequency is superposed to the laser when the second recording layer is reproduced,
- wherein the laser driver supplies a laser driving current on which no high-frequency current is superposed to the laser when the kind of the optical disk is discriminated depending on kind of the optical disk before the optical disk apparatus reproduces information on the optical disk, and supplies a laser driving current on which the first or second high-frequency current is superposed to the laser when the first or second recording layer is reproduced.

* * * * *